United States Patent [19]
Scholder et al.

[11] Patent Number: 5,650,911
[45] Date of Patent: Jul. 22, 1997

[54] APPARATUS FOR THE EXPANSION OF COMPUTER CHASSIS INPUT/OUTPUT CONNECTIONS

[75] Inventors: Erica J. Scholder; Timothy M. Radloff, both of Austin, Tex.

[73] Assignee: Dell U.S.A., L.P., Round Rock, Tex.

[21] Appl. No.: 547,651

[22] Filed: Oct. 24, 1995

[51] Int. Cl.⁶ .............................. G06F 1/16; G05K 7/04
[52] U.S. Cl. .......................... 361/684; 361/683; 439/61
[58] Field of Search .................................... 361/683–686, 361/724–727, 784, 785, 796; 364/708.1; 439/61, 62, 64; 312/223.1, 223.2

[56] References Cited

U.S. PATENT DOCUMENTS

| | | | |
|---|---|---|---|
| 5,121,295 | 6/1992 | Lam | 361/686 |
| 5,163,833 | 11/1992 | Olsen et al. | 439/61 |
| 5,438,476 | 8/1995 | Steffes | 361/683 |
| 5,519,573 | 5/1996 | Cobb et al. | 361/686 |
| 5,564,930 | 10/1996 | Yu | 439/61 |

*Primary Examiner*—Leo P. Picard
*Assistant Examiner*—Lynn D. Feild
*Attorney, Agent, or Firm*—Haynes and Boone, L.L.P.

[57] ABSTRACT

An apparatus for the expansion of computer chassis input/output connections is disclosed. The apparatus comprises a computer chassis with an exterior wall having a rectangular access opening therethrough. Four ledges extend inwardly from the exterior wall, one ledge on each side of the access opening, with two ledges on opposite sides of the access opening each having two spaced slots. A card having at least one connector disposed thereon is connectable to an edge connector disposed on the system planar in the chassis. A rectangular panel having a base, with at least one aperture therethrough to receive the connector, and four walls extending perpendicular to the base, one wall on each side, is provided. Two of the walls on opposite sides of the panel each have two spaced hooks engageable with the slots in the ledges, such that the panel may be removably secured to the exterior wall on the interior of the chassis and permit access to the connector through the access opening.

23 Claims, 3 Drawing Sheets

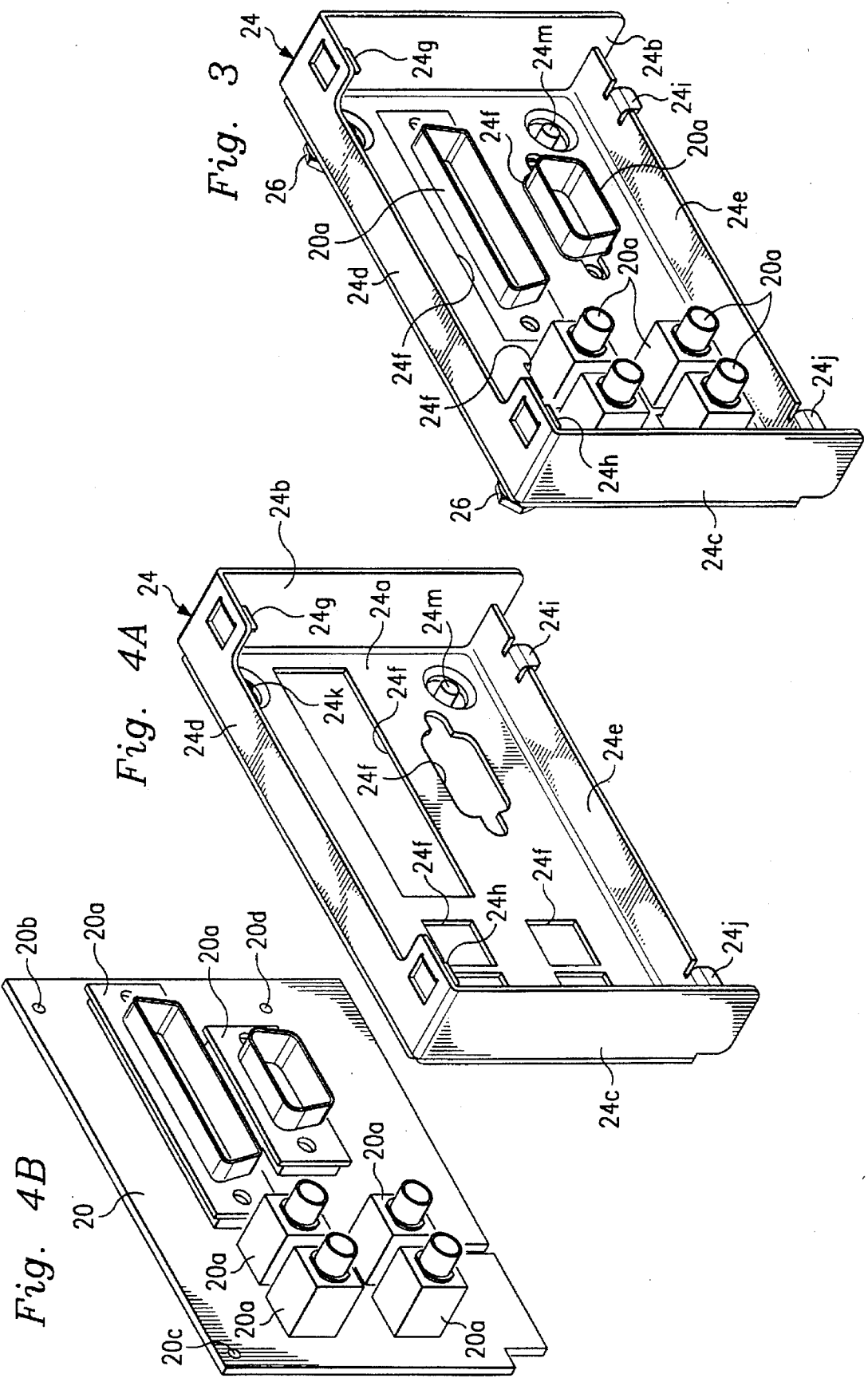

5,650,911

APPARATUS FOR THE EXPANSION OF COMPUTER CHASSIS INPUT/OUTPUT CONNECTIONS

TECHNICAL FIELD

The invention relates generally to computers and, more specifically, to an apparatus for the expansion of input/output connections in a computer chassis.

BACKGROUND OF THE INVENTION

In order for a personal computer manufacturer to be competitive in its rapidly changing industry, it must have the ability to introduce new and varied products to the market very quickly. One of the hindrances computer manufacturers experience in producing and delivering new and varied computers is the time required to design and manufacture a chassis to house the new electronic components demanded by consumers. Even using the most advanced CAD tools, designing, tooling and producing a computer chassis is a task that typically requires several months from start to finish. Accordingly, it is necessary that a single chassis of a particular design be able to accommodate a broad range of electronics.

One of the challenges in designing a chassis to accommodate a broad range of electronics is the need for connections to external devices such as storage devices, video, keyboard, mouse, serial interfaces, parallel interfaces, speakers, networks cards, etc. The reason allowing for external connections is such a challenge is that current computer systems are designed with a principal circuit carrying board, often known as a "system planar" or "motherboard" secured within a chassis with external connectors secured directly to the system planar and with corresponding openings provided in the chassis to allow a cabled connection to be made with the external device.

The number, type and shape of connectors and external devices is constantly changing and expanding, and consumers demand a broad variation in the number and type of external connections available on each computer system. Because the placement of each external connector requires a corresponding access opening in the computer chassis, either the system planar must be designed to conform to the access openings in an existing chassis, which can limit the variation in connector options, or the chassis design must follow the system planar design, extending the time in which the system can be delivered.

An additional problem faced by system planar designers is that expansion cards requiring communication to devices outside the chassis contain their own card-specific input/output connector located along one edge of the expansion card. This necessitates positioning the expansion cards such that the edge containing the input/output connector is located along the back of the chassis, regardless of whether this is an efficient electrical location on the system planar. With typical computers allowing for a number of expansion boards, the space dedicated to expansion card input/output connectors consume a great deal of area at the back of the computer chassis. Moreover, as has been the case with electronics in general, there has been increased pressure to reduce system planar size with a corresponding pressure to reduce chassis size. The effect has been a steady decrease in the amount of board and chassis space available secure external input/output connectors.

Accordingly, it is desirable to provide for a computer chassis that may be used across a broad range of systems, regardless of the number and type of input/output connectors desired for use in the system, with minimal investment in chassis redesign. Further, it is desirable to place expansion cards in locations that are not adjacent to the system planar edge.

SUMMARY OF THE INVENTION

The computer chassis input/output connection expansion apparatus of the present invention avoids and overcomes the above-mentioned disadvantages and drawbacks characteristic of the prior art. In a departure from the art, a computer chassis input/output connection expansion apparatus of the present invention consists of an access opening in an exterior wall of a chassis. A circuit card having at least one external connector disposed thereon is electrically connectable to a system planar located within the chassis and a panel having at least one aperture is secured to the card such that the external connector passes through the aperture and is accessible through the access opening.

In one aspect of the invention, a rectangular access opening is disposed in the exterior wall of the computer chassis. Four ledges extend from the exterior wall, one ledge on each side of the access opening, with two ledges on opposite sides of the access opening each having two spaced slots. A card having at least one connector disposed thereon is connectable to an edge connector disposed on the system planar in the chassis. A rectangular panel having a base, with at least one aperture therethrough to receive the connector, four walls extending perpendicular to the base, one wall on each side, is also provided. Two of the walls in the panel on opposite sides of the panel each have two spaced hooks to cooperate with the slots in the ledges, such that the panel may be removably secured to the exterior wall and the connector is accessible through the access opening.

In an alternative embodiment, one or more additional external connectors may be located on the system planar between the exterior wall of the chassis and the edge connector.

A technical advantage achieved with the invention is that it allows the chassis to be used across a broad range of systems, regardless of the number and type of input/output connectors desired for use in the system, with minimal investment in chassis redesign.

A further technical advantage achieved with the invention is that it enables expansion cards to be placed in locations that are not adjacent to the system planar edge.

BRIEF DESCRIPTION OF THE DRAWINGS

FIG. 3. is a perspective view of the assembled card and closeout panel shown in FIGS. 1 and 2.

FIG. 4A is a perspective view of the closeout panel shown in FIG. 3.

FIG. 4B is a perspective view of the card shown in FIG. 3.

DESCRIPTION OF THE PREFERRED EMBODIMENT

Figure 1:
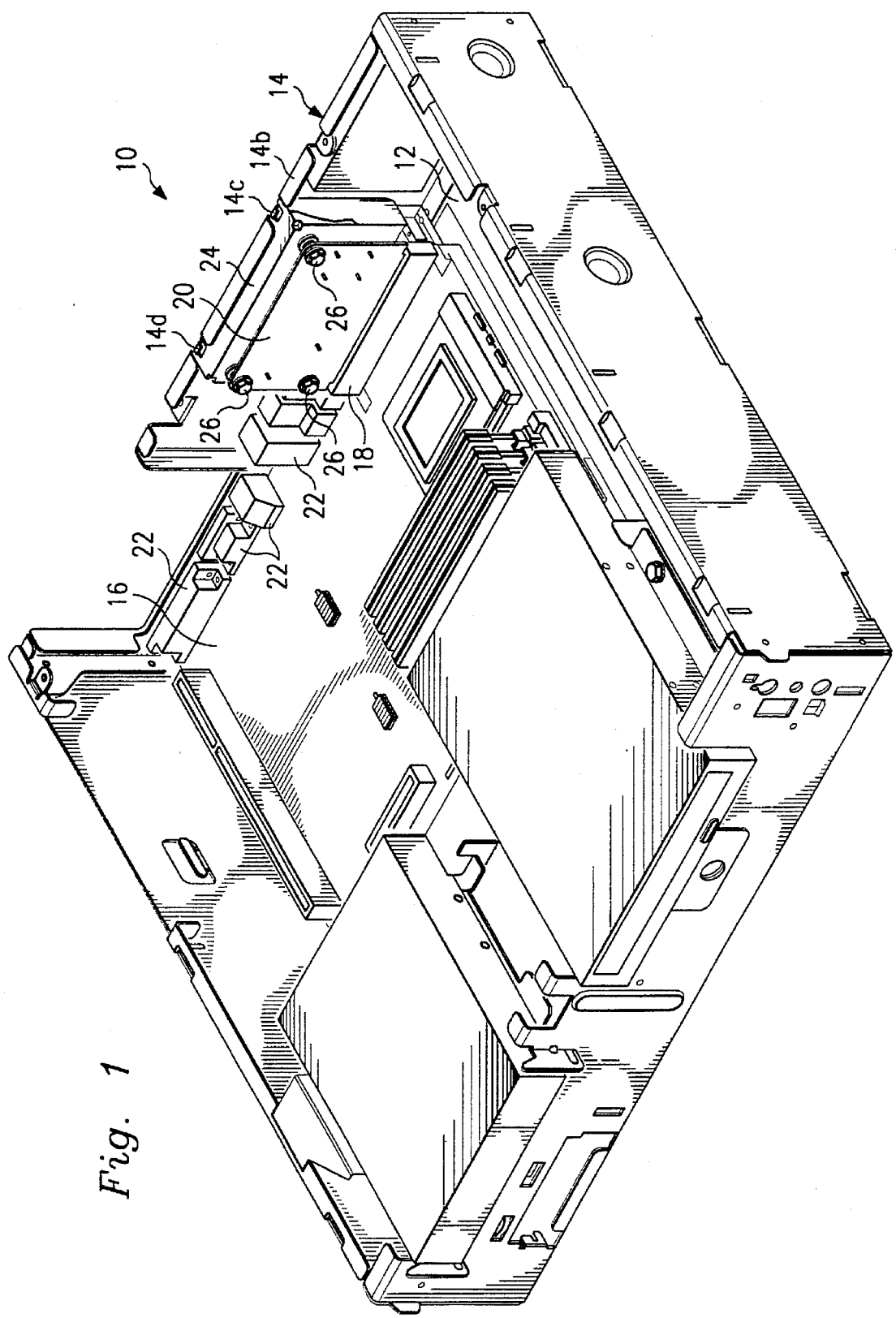
FIG. 1 is a front and right side perspective view of a computer chassis incorporating the input/output connect/on expansion apparatus of the present invention.
Figure 2:
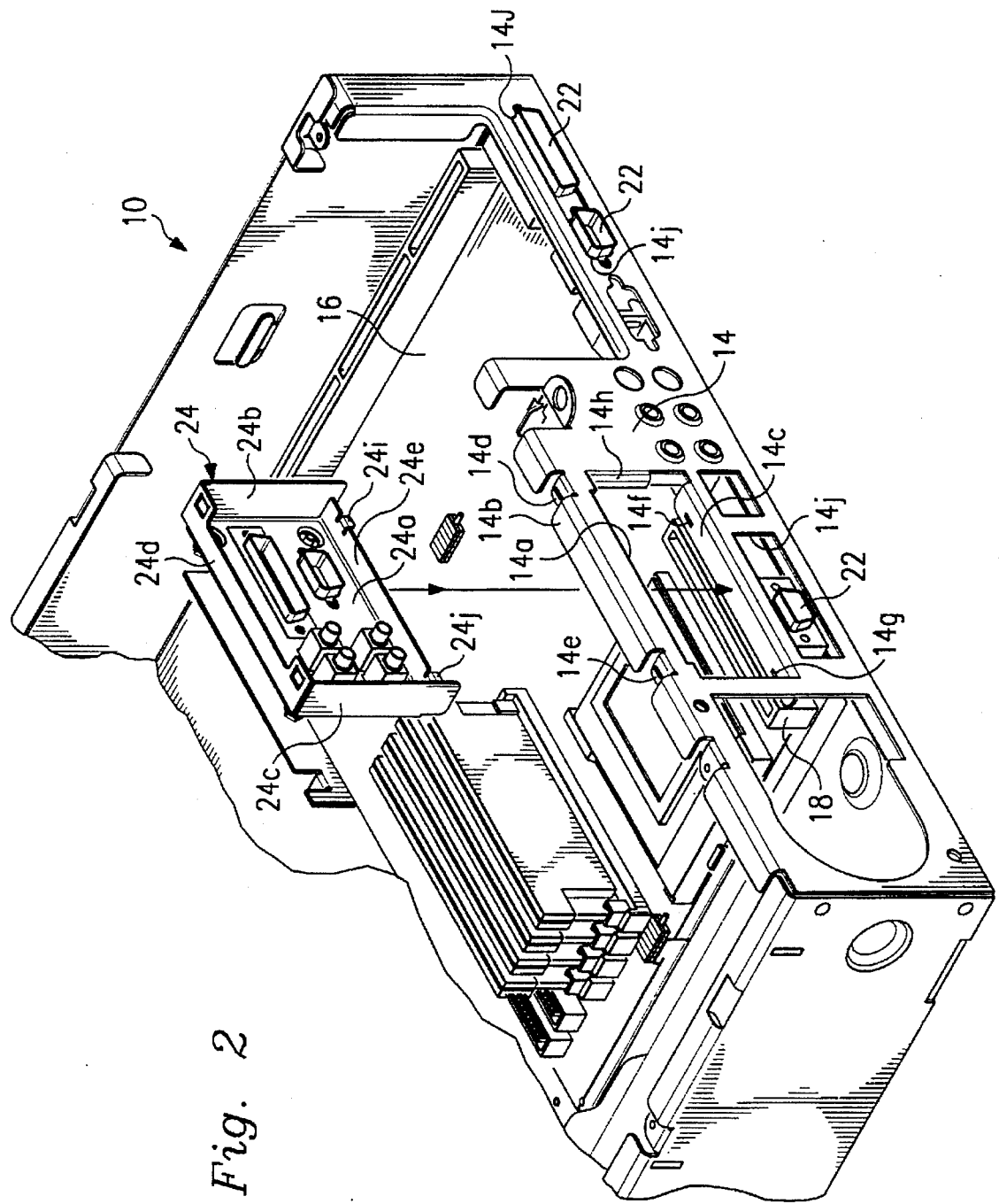
FIG. 2 is a rear perspective view of the computer chassis of FIG. 1 with the card and closeout panel of the input/output connection expansion apparatus removed from the computer chassis.

Referring to FIGS. 1 and 2, the reference numeral 10 designates, in general, a computer chassis embodying features of the present invention. The chassis 10 is comprised of a substantially horizontal floor 12 and a rear wall 14 that extends vertically upward from the floor 12 as shown in FIG. 1. As shown in FIG. 2, a rectangular access opening 14a is formed in the rear wall 14 to permit access to the external device connectors as will be described. A top ledge 14b extends perpendicularly (horizontal in this perspective) from the top of the rear wall 14 and a bottom ledge 14c extends perpendicularly (horizontal in this perspective) from the rear wall 14 below the opening 14a. A pair of spaced upper slots 14d and 14e are formed in the top ledge 14b on the respective sides of the opening 14a, and a pair of spaced lower slots 14f and 14g are formed in the lower ledge 14b on the respective sides of the opening 14a, for reasons to be described. Additionally, two side flanges, or side ledges, 14h, only one of which can be seen in the views shown in FIGS. 1 and 2, extend perpendicularly (vertical in this perspective) from the rear wall 14 proximate the two sides of the access opening 14a.

A system planar, or motherboard, 16 is horizontally disposed on the chassis floor 12 with one edge portion adjacent to the lower edge of the rear wall 14. It is understood that the system planar 16 may be secured to the chassis floor 12 in any know manner. A female edge connector 18 is disposed on the upper surface of the system planar 16 proximate the opening 14a in the chassis wall 14 and is secured to the system planar 16 with appropriate electrical connections between electronic components resident on the system planar 16 and the edge connector 18. The edge connector 18 is adapted to receive the lower edge portion of an expansion card 20, it being understood that cooperating male and female electrical terminals are provided in the connector and on the end portion of the card, respectively, to complete a series of electrical connections when the card 20 is inserted into the connector 18, in a conventional manner. As shown in FIG. 2, a plurality of connectors 20a project from the rear surface of the card 20 for receiving corresponding connectors from external devices. It is understood that the circuitry required for communication with the external devices may be located on the system planar 16, the card 20 or on additional expansion cards attached to the system planar 16.

As shown in FIGS. 1 and 2 additional expansion connectors 22 are disposed on the upper surface of the system planar 16 adjacent corresponding openings 14j in the rear wall 14 of the chassis 10. In the embodiment shown, the connectors 22 occupy substantially all of the system planar 16 edge along the rear wall 14, which necessitates placing the edge connector 18 behind the connectors 22 on the upper surface of the system planar 16.

As shown in FIG. 1, a closeout panel 24 extends between the connector 18 and the inner surface of the rear wall 14 proximate the access opening 14a. As better shown in FIGS. 3 and 4A, the closeout panel 24 is rectangular in shape with a base 24a, two side walls 24b and 24c that extend perpendicular to and along opposite sides of the base 24a, and a top wall 24d and a bottom wall 24e that also extend perpendicular to the base 24a. The height and width of the panel 24 are slightly greater than the height and width, respectively, of the access opening 14a of the rear wall 14 so as to cover the opening 14a. A plurality of apertures 24f are formed through the panel base 24a for receiving the projecting connectors 20a of the card 20, as shown in FIGS. 2 and 3. It is understood that any number and shapes of openings 24f may be placed in the closeout panel 24f to accommodate corresponding connectors 20a located on card 20. Two spaced, substantially downward projecting (in this perspective), upper hooks 24g and 24h are formed in the panel top wall 24d, and two similar lower hooks 24i and 24j are formed in the panel bottom wall 24e for insertion into the slots 14c, 14d, 14f and 14g, respectively, in the chassis rear wall 14.

Referring to FIG. 4A, three apertures 20b, 20c and 20d are formed in the card 20 and three corresponding apertures, only two of which, apertures 24k and 24m are shown in the drawings, are formed in the closeout panel 24. These apertures are utilized to secure the card 20 to the closeout panel 24 by screws 26, in the embodiment shown, such that the connectors 20a pass through corresponding apertures 24f in the closeout panel 24. It is understood that card 20 may be secured to closeout panel 24 by fasteners, adhesives, or any other appropriate method, as long as the card 20 may be removably secured in the edge connector 18 and the closeout panel 24 may be removably secured to the rear wall 14 of the chassis 10.

Operation of the input/output expansion apparatus will now be described. As shown in FIG. 3, the closeout panel 24 is secured to the card 20, by screws 26, such that the connectors 20a pass through corresponding apertures 24f in the closeout panel 24. After the closeout panel 24 is secured to the card 20, the hooks 24g–24j are inserted into the slots 14c, 14d, 14f and 14g, respectively, in the rear wall 14. The closeout panel 24 and the attached card 20 are then moved vertically downward (in the orientation illustrated in FIG. 2) until the hooks 24g–24j engage the slots 14c, 14d, 14f and 14g and the lower portion of the card 20 is inserted into the edge connector 18. When the hooks 24g–24j engage the slots 14c, 14d, 14f and 14g, the top wall 24d abuts the top ledge 14b, the bottom wall 24e rests on top of the bottom ledge 14c, and the two side walls 24b and 24c are located between the two side flanges 14h and 14i. With the card 20 inserted into the edge connector 18, the closeout panel 24 seals the access opening 14a in the rear wall 14. By sealing the access opening 14a, the closeout panel 24 provides insulation against electromagnetic radiation and noise, as well as protection against dirt and dust invasion. Accordingly, the card 20 is secured to the system planar 12 by the edge connector 18, and the closeout panel 24 is secured to the rear wall 14 by the slots 14c, 14d, 14f and 14g. The card 20 may then be connected by means of cabling to external devices by connectors 20a through access openings 24f to provide the required expanded input/output connections.

The card 20 may be similarly removed from the computer chassis by a reverse operation. The card 20 is first disconnected from any peripheral devices. Then the interface plate 24 and associated card 20 are moved vertically up (in the orientation illustrated in FIG. 2), to disconnect the card 20 from the female connector 18. As the closeout panel 24 is lifted the hooks 24g–24j are removed from the slots 14c, 14d, 14f and 14g and the closeout panel 24 and its associated card 20 are removed from the computer chassis 10.

Several technical advantages result from the foregoing. Because of the walled design of the closeout panel 24 the edge connector 18 may be placed behind the connectors 22 to permit external connection to the connectors 20a through access opening 14a without occupying board space along the edge of the system planar 16 while still providing insulation against electromagnetic radiation and noise, as well as protection against dirt and dust invasion. Further, by providing the opening 14a in the rear wall 14 of the chassis 10, and providing the edge connector 18 to receive the card 20, various configurations of external device connectors 20a may be added to the computer system with only a redesign of the closeout panel 24 and card 20. This permits the system planar 16 designer to accommodate a vast array of external connections 20a without incurring the delay associated with a chassis redesign. Accordingly, the chassis 10 may be utilized in a number of configurations allowing the computer manufacturer to bring systems to the market without incurring the cost and time required to redesign the chassis 10.

Additionally, by placing several expansion connectors on the card 20, additional expansion cards need not be placed adjacent to a chassis 10 wall for connection outside the chassis 10, since, as long as an appropriate electrical connection is made between the card 20 and the additional expansion card, the associated connectors can be placed on the card 20. This enables the designer of the system planar 16 to place expansion cards in locations that are convenient electrically rather than dedicate a given amount of system planar 16 space at the edge of the system planar 16 to expansion card connectors. By doing this, the system planar 16 designer may be able to increase the number of expansion cards that can be utilized with the system planar 16.

Although an illustrative embodiment of the invention has been shown and described, other modifications, changes, and substitutions are intended in the foregoing disclosure. For example, the connection between the closeout panel 24 and the rear wall 14 can take on any form as long as the connectors 20a are accessible outside the chassis 10. Additionally, the opening 14a need not be placed in the rear chassis wall 14, but can be placed at any convenient location on the chassis 10. Moreover, the panel 24 can be made without any apertures to accommodate planars that do not have expansion capability, thereby allowing a low-end product to use the same panel as a product that requires the additional connectors out the back. The blank panel system could later be upgraded by providing a new planar and a new panel 24. Accordingly, it is appropriate that the appended claims be construed broadly and in a manner consistent with the scope of the invention.

What is claimed is:

1. An apparatus for increasing the number of input/output connections in a computer chassis relative to a system planar, the apparatus comprising:
   an exterior wall in said chassis having an access opening therethrough;
   a card electrically connectable to said system planar by an edge connector disposed on said system planar, said card having at least one external connector disposed thereon; and
   a panel removably secured to said card and having at least one aperture therethrough corresponding to said at least one external connector, said panel secured to said chassis and said card electrically connected to said system planar such that said at least one external connector is accessible through said access opening;
   wherein a second external connector is disposed on said system planar proximate said exterior wall between said edge connector and said exterior wall.

2. The apparatus of claim 1 wherein said card and said panel are removable from said chassis.

3. The apparatus of claim 1 wherein said edge connector is a female edge connector and said card includes a male edge connector for connecting to said female edge connector.

4. The apparatus of claim 1 wherein said access opening is rectangular in shape, the apparatus further comprising a first ledge extending into said chassis from said exterior wall proximate said access opening, said panel being attached to said first ledge.

5. The apparatus of claim 4 wherein said first ledge has at least one slot formed therein, said panel having at least one hook engageable with said slot for attaching said panel to said first ledge.

6. The apparatus of claim 4 further comprising a second ledge extending into said chassis from said exterior wall, wherein said first and second ledges are located on opposite sides of said access opening, said panel being attached to said ledges.

7. The apparatus of claim 6 wherein said first and second ledges each have at least one slot formed therein, said panel having at least two hooks engageable with said slots for attaching said panel to said ledges.

8. The apparatus of claim 6 wherein said first ledge is located proximate the top of said access opening and said second ledge is located proximate the bottom of said access opening, and further comprising two flanges extending into said chassis from said exterior wall and wherein each of said flanges is located proximate one of the remaining two sides of the access opening.

9. The apparatus of claim 1 wherein said panel is comprised of a base having at least one aperture therethrough and four walls extending perpendicular to said base, at least one of said walls being removably attachable to said exterior wall.

10. The apparatus of claim 1 further comprising a second card electrically connectable to said system planar, said first and second cards being electrically connected.

11. An apparatus for increasing the number of input/output connections in a computer chassis relative to a planar, the apparatus comprising:
    an exterior wall in said chassis having a rectangular access opening therethrough;
    first, second, third and fourth ledges extending into an interior of said chassis from said exterior wall along each side of said access opening, said first and third ledge being on opposite sides of said access opening, and each having two spaced slots formed therethrough;
    a card having at least one external connector disposed thereon;
    an edge connector disposed on said system planar for receiving one edge of said card to create an electrical contact therebetween;
    a rectangular panel having a base, with at least one aperture therethrough to receive said at least one connector, first, second, third and fourth walls extending perpendicular to said base along each side of said panel, said first and third walls being on opposite sides of said panel and each having two spaced hooks formed therethrough for reception by said slots such that said panel may be removably secured to said exterior wall and said at least one external connector is accessible through said access opening;
    wherein a second external connector is disposed on said system planar proximate said exterior wall between said edge connector and said exterior wall.

12. The apparatus of claim 11, wherein said edge connector is a female edge connector and said card has a male edge connector for connecting to said female edge connector.

13. The apparatus of claim 11 further comprising a second card electrically connectable to said system planar, said first and second cards being electrically connected.

14. Computer apparatus comprising:
    a chassis structure including an external chassis wall having an access opening therethrough, said chassis having a system planar installed therein;

first and second circuit boards operatively installable on said system planar via an edge connector disposed on said system planar, the first and second circuit boards having mutually different external through-chassis connection requirements for components mounted thereon;

first and second panel members respectively connected to said first and second circuit boards, said first panel member having apertures for accommodating said external through-chassis connection requirements of said components mounted on said first circuit board and said second panel having apertures for accommodating said external through-chassis connection requirements of said components mounted on said second circuit board, such that when said first circuit board is operatively installed in said system planar, said first panel seals said access opening and said components mounted on said first circuit board are accessible through said access opening and when said second circuit board is operatively installed in said system planar, said second panel seals said access opening and said components mounted on said second circuit board are accessible through said access opening; and an external connector disposed on said system planar proximate said exterior chassis wall between said edge connector and said exterior chassis wall.

15. The apparatus of claim 14 wherein said edge connector is a female edge connector and said first and second circuit boards each have a male edge connector for connecting to said female edge connector.

16. The apparatus of claim 14 further comprising a first ledge extending into said chassis proximate said access opening to which said first and second panel members are attachable.

17. The apparatus of claim 16 wherein said first ledge has at least one slot formed therein, and said first and second panels each having at least one hook engageable with said at least one slot for attaching one of said panels to said first ledge.

18. The apparatus of claim 16 further comprising a second ledge extending into said chassis, said first and second ledges being located on opposite sides of said access opening.

19. The apparatus of claim 18 wherein said first and second ledges each have at least one slot formed therein, said panels each having at least two hooks engageable with said slots for attaching one of said panels to said ledges.

20. The apparatus of claim 18 wherein said first ledge is located proximate the top of said access opening and said second ledge is located proximate the bottom of said access opening, and further comprising two flanges extending into said chassis, and wherein each of said flanges is located proximate one of the remaining two sides of the access opening.

21. The apparatus of claim 14 wherein each of said first and second panels are comprised of a base having at least one aperture therethrough, and four walls extending perpendicular to said base, at least one of said walls being removably attached to said chassis.

22. The apparatus of claim 14 further comprising a third circuit board electrically connectable to said system planar, said first and second circuit boards being electrically connectable to said third circuit board.

23. A method of constructing a computer comprising the steps of:

providing a chassis having an interior space and an exterior wall having an access therethrough;

providing a system planar for operative installation in said interior space of said chassis, said system planar having an edge connector and a first external connector disposed thereon such that said external connector is positioned between said edge connector and said exterior wall;

providing a plurality of circuit boards having additional external connectors disposed thereon, any one of which circuit boards may be operatively installed in said system planar via an said edge connector;

providing a plurality of panels having differently configured apertures therethrough and each corresponding to one of said circuit boards;

securing one of said panels to said corresponding one of said circuit boards such that said additional external connectors of said corresponding one of said circuit boards are accessible through said apertures of said one of said panels;

connecting said secured panel and circuit boards to said system planar such that said additional external connectors are accessible through said access opening.

* * * * *

UNITED STATES PATENT AND TRADEMARK OFFICE
CERTIFICATE OF CORRECTION

PATENT NO. : 5,650,911
DATED : July 22, 1997
INVENTOR(S) : Erica J. Scholder and Timothy M. Radloff It is certified that error appears in the above-identified patent and that said Letters Patent is hereby corrected as shown below:

Column 2, line 49, "fight" should be --right--.

Column 2, line 50, "connect/on" should be --connection--.

Signed and Sealed this

Third Day of March, 1998

Attest:

BRUCE LEHMAN

*Attesting Officer*  *Commissioner of Patents and Trademarks*